(12) United States Patent
Mohri et al.

(10) Patent No.: US 6,951,458 B2
(45) Date of Patent: Oct. 4, 2005

(54) REACTOR COMBUSTION CONTROL METHOD AND REACTOR

(75) Inventors: Takaaki Mohri, Kanagawa (JP); Toshiaki Yoshioka, Kanagawa (JP); Yoshikazu Hozumi, Tokyo (JP); Tetsu Shiozaki, Kanagawa (JP); Toshiaki Hasegawa, Saitama (JP); Susumu Mochida, Kanagawa (JP)

(73) Assignees: Chiyoda Corporation, Kanagawa (JP); Nippon Furnace Kogyo Kaisha, Ltd., Kanagawa (JP)

( * ) Notice: Subject to any disclaimer, the term of this patent is extended or adjusted under 35 U.S.C. 154(b) by 0 days.

(21) Appl. No.: 10/508,929

(22) PCT Filed: Mar. 28, 2003

(86) PCT No.: PCT/JP03/04027

§ 371 (c)(1),
(2), (4) Date: Oct. 19, 2004

(87) PCT Pub. No.: WO03/087667

PCT Pub. Date: Oct. 23, 2003

(65) Prior Publication Data

US 2005/0191591 A1    Sep. 1, 2005

(30) Foreign Application Priority Data

Mar. 29, 2002  (JP) ................. 2002-95698
Feb. 25, 2003  (JP) ................. 2003-47072

(51) Int. Cl.$^7$ ................................. F27B 3/20
(52) U.S. Cl. ................. 432/31; 432/108; 432/209
(58) Field of Search ................. 432/31, 175, 179, 432/180, 181, 182, 120, 209; 110/210; 126/91 A; 431/215, 328

(56) References Cited

U.S. PATENT DOCUMENTS

| 5,338,184 | A | * | 8/1994 | Dalhuisen ................. 431/12 |
| 5,443,040 | A |   | 8/1995 | Kaji et al. |
| 5,951,280 | A | * | 9/1999 | Kubota ................. 432/180 |
| 6,065,961 | A | * | 5/2000 | Shaffer et al. ................. 431/328 |
| 6,528,027 | B1 | * | 3/2003 | Brewer et al. ................. 422/200 |

FOREIGN PATENT DOCUMENTS

| JP | 7-238288 A | 9/1995 |
| JP | 11-179191 A | 7/1999 |
| JP | 2001-152166 A | 6/2001 |
| WO | WO98/38459 A1 | 9/1998 |

* cited by examiner

Primary Examiner—Gregory Wilson
(74) Attorney, Agent, or Firm—Pearne & Gordon LLP

(57) ABSTRACT

A reactor combustion control method using a high temperature air combustion technology capable of reducing a temperature difference in a reactor without producing cracking and caulking in reaction tubes and the reactor controlled by using the method, the reactor wherein second burners (8) are disposed in a space formed between two or more reaction tubes (7) adjacent to each other so as to inject fuel in the extending direction of the reaction tubes (7).

24 Claims, 15 Drawing Sheets

REACTOR COMBUSTION CONTROL METHOD AND REACTOR

FIELD OF THE INVENTION

The present invention relates to a reaction furnace employing high temperature air combustion technology.

BACKGROUND OF THE INVENTION

Japanese Patent Application Laid-open Publication No. 179191/1999 (Application No. 357263/1997) discloses a technology for increasing reaction efficiency in a plurality of reaction pipes. In this technology, a regenerative combustion apparatus of a high temperature air combustion type is used in elevating a temperature inside a furnace in which series of reaction pipes are laterally arranged.

Japanese Patent Application Laid-open Publication No. 152166/2001 (Application No. 343624/1999) discloses a technology relating to a reaction furnace which employs high temperature air combustion technology. "High Temperature Air Combustion Technology" is defined as a technology which carries out combustion by pre-heating combustion air to as high as 800° C., feeding the high temperature combustion air to a combustion chamber at a high speed, and injecting a fuel into the combustion air. This disclosed technology is capable of reducing as much as possible a difference in temperature among fields of temperature inside a furnace in which series of reaction pipes are arranged, without enlarging a combustion chamber.

Employing the high temperature air combustion technology can reduce a difference in temperature inside the reaction furnace as much as possible. In a configuration, however, there are many reaction pipes or series of reaction pipes, existence of the pipes becomes resistance against thermal conduction. Consequently, the temperature of a space defined among the reaction pipes and the temperature of the outside of such space tend to differ more largely. Such a difference in temperature, in turn, will cause cracks of the pipes or coking. For this reason, it is necessary to reduce such a difference in temperature. Thermal conduction to the pipes depends upon radiant heat from a furnace wall. The pipes located outer cast shadows or become obstacles for inner pipes in thermal conduction. The respective pipes are not uniformly heated, thereby causing a problem that an amount of heat received by the entire pipes, namely efficiency in thermal conduction is decreased.

It is therefore an object of the present invention to provide a method for controlling combustion of a reaction furnace employing high temperature air combustion technology and a reaction furnace employing the same technology which is capable of reducing a difference in temperature inside the furnace without causing cracks of the pipes or coking in the pipes.

It is another object to provide a reaction furnace and a method for controlling combustion of a reaction furnace that are capable of preventing significant ununiformity in temperature distribution on a pipe wall in a circumferential direction of each reaction pipe.

It is further another object to provide a reaction furnace and a method for controlling combustion of a reaction furnace that are capable of suppressing an increase in CO (carbon oxide) concentrations without lowering thermal efficiency.

It is yet another object to provide a reaction furnace and a method for controlling combustion of a reaction furnace that are capable of increasing an amount of received heat (efficiency in thermal conduction) more than ever.

DISCLOSURE OF THE INVENTION

According to the present invention, a reaction furnace employing high temperature air combustion technology comprises a furnace body having a furnace wall which surrounds a combustion chamber therein. In this furnace body, a plurality of reaction pipes are provided between a pair of opposing wall portions of the furnace wall and juxtaposedly arranged therebetween so as to extend in the same direction. The reaction furnace also comprises a plurality of first burners which are arranged outside the reaction pipes and provided at the furnace wall of the furnace body for burning a fuel in the combustion chamber. The reaction furnace further comprises a heat exchange type combustion air supply apparatus for discharging exhaust gas from the combustion chamber to the outside of the reaction furnace through an air-permeable regenerating means and supplying to the combustion chamber combustion air elevated to a high temperature with sensible heat stored in the regenerating means.

Generally, the reaction pipes are mounted directly or indirectly through a support structure between a pair of opposing wall portions (for example, bottom and top walls) of the furnace wall which surrounds the combustion chamber inside the furnace body. The first burners are mounted on one of the bottom, top, and side walls. Combustion air is typically heated to as high as 800° C. or more with sensible heat stored in a regenerator. The first burner and a partial combustion air supply apparatus for the first burner may be combined to constitute one regenerative burner of a high temperature air combustion type. As regenerative burners of the high temperature air combustion type, a publicly known regenerative burner of a continuous combustion type may be used, for example the one which is disclosed in Japanese Patent Application Nos. 223335/1999 and 39138/2000. In this kind of the regenerative burner, one burner includes divided regenerators therein. Combustion air is supplied to part of the divided regenerators and combustion gas is simultaneously absorbed into remaining divided regenerators for heat accumulation. Flow paths for supplying the combustion air and discharging the combustion gas are periodically switched, and heat accumulation and discharge are repeated inside one burner system. An outlet for discharging air of an elevated temperature is shifted in a circumferential direction with the switching of the flow paths. The fuel, however, can be continuously supplied from one burner.

A regenerative burner of the high temperature air combustion type may also be constituted by using a so-called alternate regenerative burner. In the alternate regenerative burner, combustion air and exhaust gas are alternately fed into one whole regenerator to thereby heat the combustion air with sensible heat stored in the regenerator. The alternate regenerative burners are largely grouped into a continuous combustion type which continuously carries out combustion of the burner and an intermittent combustion type which intermittently carries out combustion of the burner. An alternate regenerative burner of a continuous combustion type is, for example, disclosed in Japanese Patent Application Laid-open Nos. 256423/1993 and 11121/1994. An alternate regenerative burner of an intermittent combustion type is, for example, disclosed in Japanese Patent Application Laid-open No. 222102/1989.

A reaction furnace of the present invention further comprises one or more second burners so constructed as to inject the fuel in an axial direction or a longitudinal direction of the reaction pipes toward a space defined among two or more adjacent pipes of the reaction pipes. The one or more second burners are fixedly provided in at least one of paired fixing areas of the paired wall portions where the reaction pipes are provided. According to the present invention, by arranging the one or more second burners inside a collection of the reaction pipes, it is possible to heat with the second burners whose reaction pipes located in such portions that are shadowed by the reaction pipes located other than the shadowed pipes. Consequently, the fields of temperature formed inside the collection of the reaction pipes can be controlled, thereby reducing a difference in temperature inside the reaction furnace.

However, when the second burners are operated positively to burn the fuel from the beginning of combustion, heat from the second burners cause a great difference in temperature among the fields of temperature or local overheating at each pipe. After the high temperature air combustion state is attained in the combustion chamber, heat from the first burners, in turn, causes a difference in temperature among the fields of temperature. In view of these problems, according to the present invention, only the first burners are basically operated to elevate the temperature in the combustion chamber until a high temperature air combustion state is attained. Once the high temperature air combustion state is attained, the one or more second burners are started for combustion. Then, a combustion amount of the first burners is reduced with an increase in combustion of the one or more second burners to thereby attain a necessary combustion state. During a period until the high temperature air combustion state is attained, the second burners may be operated to burn the fuel as long as the second burners do not have significant effect. In this case, the first burners are primarily used to elevate the temperature in the combustion chamber. After the high temperature air combustion state is attained in the combustion chamber, a combustion amount of the one or more second burners is increased and that of the first burners is reduced with an increase in combustion in the one or more second burners to attain a necessary combustion state.

By the method for controlling combustion according to the present invention, it can be prevented to produce so great a difference in temperature of the combustion chamber as to cause cracks of the reaction pipes or coking in the pipes at the start of combustion even when the first burners and one or more second burners are used. After the high temperature air combustion state is attained in the combustion chamber, by reducing a combustion amount of the first burners with an increase in combustion in the one or more second burners to thereby attain a necessary combustion state, it can be prevented to produce so great a difference in temperature as to cause cracks of reaction pipes or coking.

After the necessary combustion state is attained, a ratio of the combustion amount of the first burners to that of the one or more second burners is maintained at a level when the necessary combustion state is attained. With this, rarely-varying, stable fields of temperature can be formed.

Preferably, the combustion ratio of the first burners to the one or more second burners falls within a range of 80:20 to 0:100. With the combustion ratio of 80:20, an amount of heat received by each of the reaction pipes can be increased even if the arrangement of the first and second burners are varied in different ways. Even with the combustion ratios of 80:20 to 50:50, an amount of received heat can also be increased though some difference in amount.

When the combustion ratio of the first burners to the one or more second burners is set to a range of 50:50 to 0:100, a combustion state can be attained where temperature distribution on a pipe wall of each reaction pipe does not become extremely ununiform in its circumferential direction. Particularly, when the combustion ratio is finally set to 0:100, ununiformity in the above-mentioned temperature distribution can be minimized and an amount of NOx and CO to be generated can be reduced most. In these cases, by defining an amount of air to be supplied to the combustion chamber by the heat exchange type combustion air supply apparatus so that an average of oxygen concentrations in the exhaust gas falls within a range of 3.5 to 6%, a difference in temperature can furthermore be lessened. As far as it is currently known, the best operational mode is such that the combustion ratio is finally set to 0:100 and the oxygen concentrations to 6%.

A reaction furnace according to the present invention comprises a plurality of partial combustion air supply apparatuses for the first burners and one or more partial combustion air supply apparatuses for the one or more second burners. The partial combustion air supply apparatuses for the first burners are so constructed as to discharge exhaust gas from the combustion chamber to the outside of the reaction furnace through one or more air-permeable regenerators and to supply to the first burners combustion air elevated to a high temperature with sensible heat stored in the one or more regenerators. The one or more partial combustion air supply apparatuses for the one or more second burners are so constructed as to discharge exhaust gas from the combustion chamber to the outside of the reaction furnace through one or more air-permeable regenerators and to supply to the one or more second burners combustion air elevated to a high temperature with sensible heat stored in the one or more regenerators. Since there is one combustion chamber inside the reaction furnace, part of the air to be supplied by the partial combustion air supply apparatuses for the first burners is certainly used for combustion of the one or more second burners. Likewise, part of the air to be supplied by the partial combustion air supply apparatuses for the one or more second burners is also used for combustion of the first burners. Accordingly, amounts of air to be supplied to the combustion chamber by the partial combustion air supply apparatuses for the first burners and/or the partial combustion air supply apparatuses for the one or more second burners are defined so that an average of oxygen concentrations in the exhaust gas falls within a range of 3.5 to 6%.

Various arrangements of the first burners and second burners can be considered. Most preferably, the first burners are fixedly provided at one of the paired wall portions of the furnace wall and the second burners are fixedly provided at the other wall portion. With this arrangement, the combustion air for the first burner and part of the heat from the first burner approach the vicinity of the second burner, thereby helping heat part of the reaction pipes located in the vicinity of that second burner. Also, in a case where the second burners are arranged on the same wall portions as the first burners, an amount of heat received by each of the reaction pipes can readily be increased without locally overheating at each of the reaction pipes.

Preferably, the second burner is so constructed as to form a partial combustion flame of which a maximum gas temperature becomes 500° C. or more. Also preferably, the first burner and the partial combustion air supply apparatus for the first burner are combined to constitute one regenerative burner of a high temperature air combustion type, and the second burner and the partial combustion air supply apparatus for the second burner are combined to constitute one regenerative burner of a high temperature air combustion type. With these preferred arrangements, efficiency in combustion control can be maximized. Since, in many cases, it is difficult to secure enough space among the collection of the reaction pipes, the partial combustion air supply apparatuses for the one or more second burners are preferably arranged outside the reaction pipes so as to supply combustion air to the one or more second burners. When the reaction pipes are short in length, the combustion air supply apparatuses for the first burners may also be used as a partial combustion air supply apparatus for the one or more second burners.

By arranging the reaction pipes so that a distance between any two adjacent pipes of the reaction pipes is equal, and arranging the second burners so that a distance between any adjacent second burner and reaction pipe is equal, the fields of temperature inside the reaction pipes can be almost uniform.

In embodying the present invention, a positional relationship of the first burners with the one or more second burners and a combustion ratio of the first burners to the one or more second burners are defined in a manner that efficiency in thermal conduction of the reaction pipes becomes more than one, supposing that an amount of heat received by the reaction pipes is one when the pipes are heated only with the first burners. With this, an amount of received heat (efficiency in thermal conduction) can be increased more than ever. "Efficiency in thermal conduction" is defined as an expression of (an amount of heat received by the reaction pipes when the second burners are operated) divided by (an amount of heat received by the reaction pipes when only the first burners are operated for heating the pipes).

In an embodiment where the partial combustion air supply apparatuses for the one or more second burners are arranged outside the reaction pipes so as to supply combustion air to the one or more second burners, an amount of the air to be supplied by the partial combustion air supply apparatus for the second burner is preferably less than 30% of a theoretical fuel air amount against an amount of the fuel to be supplied by the second burner. Thus, highly efficient combustion can be realized.

BEST MODES FOR EMBODYING THE INVENTION

Figure 1:
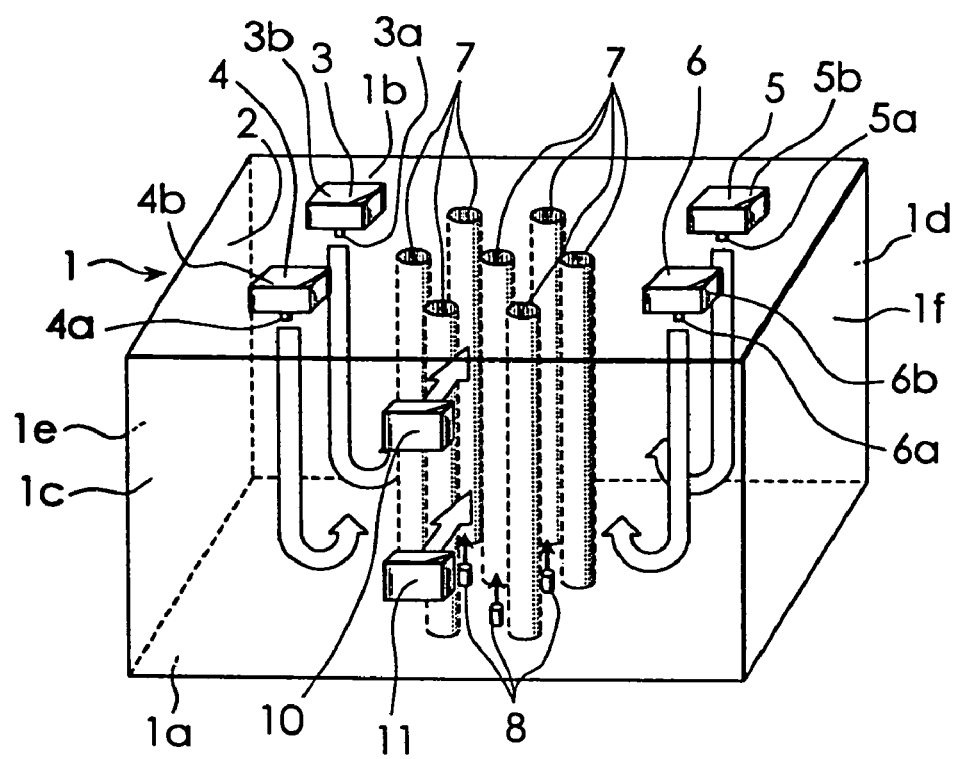
FIG. 1 is a schematic view showing the configuration of a first embodiment of the present invention adapted for a reaction furnace for testing.

The present invention will now be described in detail with reference to the accompanying drawings. FIG. 1 is a schematic view showing the configuration of an embodiment according to the present invention adapted to a reaction furnace for improvement testing. Referring first to FIG. 1, reference numeral 1 designates a furnace body having a furnace wall which surrounds a combustion chamber 2 therein. The furnace body 1 includes a bottom wall (furnace floor) 1a and a top wall (furnace ceiling) 1b which constitute a pair of wall portions, side walls 1c and 1d which constitute a pair of wall portions positioned in a width direction (a front-to-back direction as FIG. 1 is seen on the paper), and side walls 1e and if which constitute a pair of wall portions in a lateral direction (a right-to-left direction as FIG. 1 is seen on the paper).

The bottom wall (furnace floor) 1a of the furnace body 1 is supported by a support structure (not shown). The top wall (furnace ceiling) 1b of the furnace body 1 is provided fixedly with four continuous combustion type regenerative burners 3, 4, 5, 6 which respectively constitute regenerative burners of a high temperature air combustion type. A plurality of reaction pipes 7 are so arranged as to penetrate the bottom wall 1a and top wall 1b of the furnace body 1.

The continuous combustion type regenerative burners 3, 4, 5, 6 used herein are provided at the furnace wall of the furnace body 1. The continuous combustion type regenerative burners 3, 4, 5, 6 are constituted by combining first burners 3a, 4a, 5a, 6a for burning a fuel in the combustion chamber 2 and partial combustion air supply apparatuses 3b, 4b, 5b, 6b for the first burners. The partial combustion air supply apparatuses 3b, 4b, 5b, 6b for the first burners respectively have one or more air-permeable regenerators (not shown). The partial combustion air supply apparatuses 3b, 4b, 5b, 6b for the first burners are so constructed as to discharge exhaust gas from the combustion chamber 2 to the outside of the furnace through the air-permeable regenerators (not shown) and to supply to the first burners 3a, 4a, 5a, 6a combustion air elevated to a high temperature with sensible heat stored in the one or more regenerators. Since such a structure of the continuous combustion type regenerative burners is disclosed in Japanese Patent Application Laid-open Publication Nos. 223335/1999 and 39138/2000 in detail, descriptions are omitted herein.

A heating temperature for combustion air is determined by various factors such as a switching or rotational speed of the regenerators incorporated into the partial combustion air supply apparatuses 3b, 4b, 5b, 6b for the first burners as well as air-permeability and length of the regenerators. In this embodiment, these factors are defined so that the temperature of the combustion air is elevated to 800° C. or more. Certainly, materials for respective sections are selected that can endure such a high temperature. In the rear of the partial combustion air supply apparatuses 3b, 4b, 5b, 6b for the first burners, a duct structure is provided. The duct structure includes an air duct (not shown) for supplying the combustion air and an exhaust gas duct (not shown) for discharging the exhaust gas. Further, in the rear of the duct structure are arranged a forced air fan for forcibly feeding the combustion air to the air duct and an induced air fan for taking in the exhaust gas out of the exhaust gas duct.

As shown in this embodiment, when four continuous combustion type regenerative burners 3, 4, 5, 6 are used, four duct structures are collected to construct a collected duct structure for each of these regenerative burners. Typically, the collected duct structure provides one forced air fan and one induced air fan to these four duct structures for supplying the combustion air and discharging the exhaust gas. In this embodiment, two continuous combustion type regenerative burners 3, 4 are arranged on one side of a group of the reaction pipes 7 so as to inject a fuel along the axial direction of the reaction pipes 7. Another two continuous combustion type regenerative burners 5, 6 are arranged on the other side of the group of the reaction pipes 7 so as to inject the fuel along the axial direction of the reaction pipes 7. In FIG. 1, a flow of the combustion air from the regenerative burners 3, 4, 5, 6 are respectively indicated by an arrow.

Seven reaction pipes 7 are positioned each in six apexes and the center of a hexagon. Second burners 8 are so arranged as to face toward a space defined among two or more adjacent pipes 7 of the group of the seven reaction pipes 7. Four second burners 8 are respectively arranged so as to inject the fuel in the axial direction of the pipes toward a space defined between any two adjacent pipes of the seven reaction pipes 7. These second burners 8 are respectively fixed in a fixing area of the bottom wall 1a where the reaction pipes 7 are provided.

On the side wall 1c of the furnace body 1, two partial combustion air supply apparatuses 10, 11 for the second burners are arranged at an interval in a vertical direction. These two partial combustion air supply apparatuses 10, 11 are constructed in the same manner as the continuous combustion type regenerative burners 3, 4, 5, 6 mentioned above excluding the burners. Specifically, these two partial combustion air supply apparatuses 10, 11 for the second burners respectively include a regenerator, a rotating mechanism and air fans. These two partial combustion air supply apparatuses 10, 11 are so constructed as to discharge exhaust gas from the combustion chamber 2 to the outside of the furnace through the air-permeable regenerators and to supply to the second burners 8 combustion air elevated to a high temperature with sensible heat stored in the regenerators. An amount of the air to be supplied by the partial combustion air supply apparatuses 10, 11 is set to less than 50% of a theoretical fuel air amount against an amount of a fuel to be supplied by the second burners 8. This amount of the air is preferably set to less than 30%, more preferably to 5 to 20%.

In this arrangement, the reaction pipes 7 are heated with both radiant heat of the high temperature combustion gas outputted from the burners and radiant heat from the furnace wall. In this embodiment, by carrying out high temperature air combustion so that a temperature in the combustion chamber 2 becomes 800° C. or more, it is possible to lessen a difference in temperature among the fields of temperature in the combustion chamber 2 where the reaction pipes 7 are provided.

The studies carried out by the inventors of the present invention have revealed that a great difference in temperature is produced among the fields of temperature or local overheating is caused at each reaction pipe by heat from the second burners 8 at the start of combustion if the second burners 8 are positively operated from the start of combustion. Once a high temperature air combustion state is attained in the combustion chamber 2, a difference in temperature is produced among the fields of temperature if only the first burners 3a, 4a, 5a, 6a are operated. According to the present invention, only the first burners 3a, 4a, 5a, 6a are basically operated to elevate the temperature in the combustion chamber 2 until the high temperature air combustion state is attained. During a period until the high temperature air combustion state is attained in the combustion chamber 2, the second burners 8 may be operated for combustion as long as they have no significant effect. Specifically, the second burners 8 may be operated for combustion to such extent that neither local overheating nor coking is caused. In such a case, the first burners 3a, 4a, 5a, 6a are primarily operated to elevate the temperature in the combustion chamber 2 until the high temperature air combustion state is attained. "High temperature air combustion" is defined as a state in which a temperature of the combustion chamber 2 has become 800° C. or more.

After the high temperature air combustion state is attained in the combustion chamber 2, the second burners 8 are started for combustion or combustion of the second burners 8 is increased. Subsequently, a combustion amount of the first burners 3a, 4a, 5a, 6a is reduced with an increase in combustion of the second burners 8 to thereby attain a necessary combustion state. Once the necessary combustion state is attained, a combustion ratio of the first burners 3a, 4a, 5a, 6a to the second burners 8 is maintained at a level for the necessary combustion state.

The necessary combustion state depends upon a desired operational mode. For example, in order to attain a combustion state in which temperature distribution on a pipe wall of each of the reaction pipes 7 does not become ununiform in the circumferential direction of each reaction pipe 7, a combustion ratio of the first burners 3a, 4a, 5a, 6a to the second burners 8 is preferably set to a range of 50:50 to 0:100. An amount of air to be supplied to the combustion chamber 2 by the partial combustion air supply apparatuses 3b, 4b, 5b, 6b for the first burners and the two partial combustion air supply apparatuses 10, 11 for the second burner, which constitute a heat exchange type combustion air supply apparatus, is so defined that an average of oxygen concentrations in the exhaust gas falls within a range of 3.5 to 6%.

Figure 2:
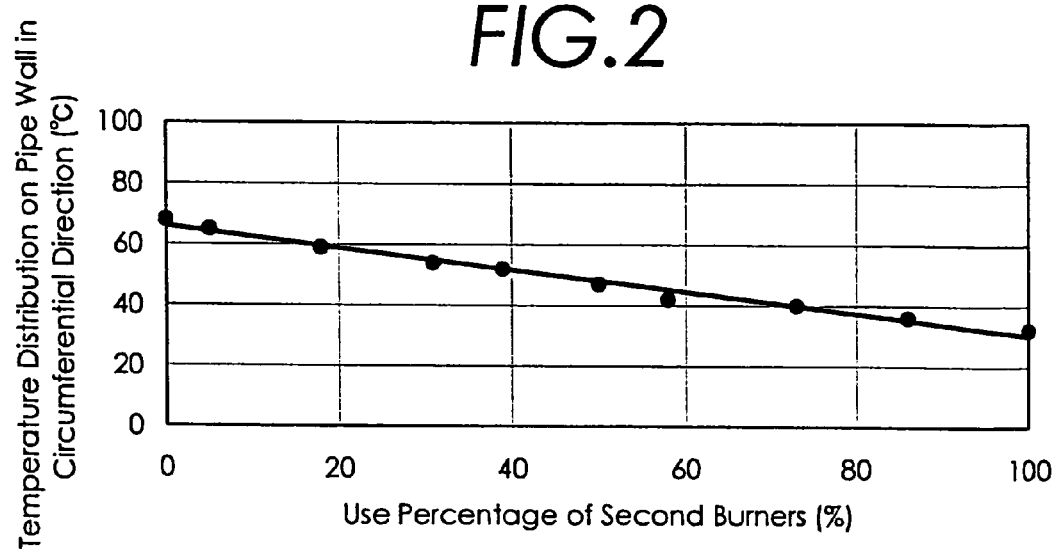
FIG. 2 shows measured averages for the maximum difference in temperature distribution on a pipe wall in a circumferential direction of each reaction pipe when a combustion ratio of the first burners to the second burners is varied within a range of 0 to 100% after the high temperature air combustion state is attained.

FIG. 2 shows measured averages for the maximum difference in temperature distribution on a pipe wall in a circumferential direction of each reaction pipe when a combustion ratio of the first burners 3a, 4a, 5a, 6a to the second burners 8 is varied within a range of 0 to 100% after the high temperature air combustion state is attained in the arrangement shown in FIG. 1. As known from FIG. 2, after the high temperature air combustion state is attained, the difference of temperature in the temperature distribution on the pipe walls becomes smaller as the combustion amount of the first burners 3a, 4a, 5a, 6a is decreased toward 0% with an increase in combustion of the second burners 8 toward 100%.

Figure 3:
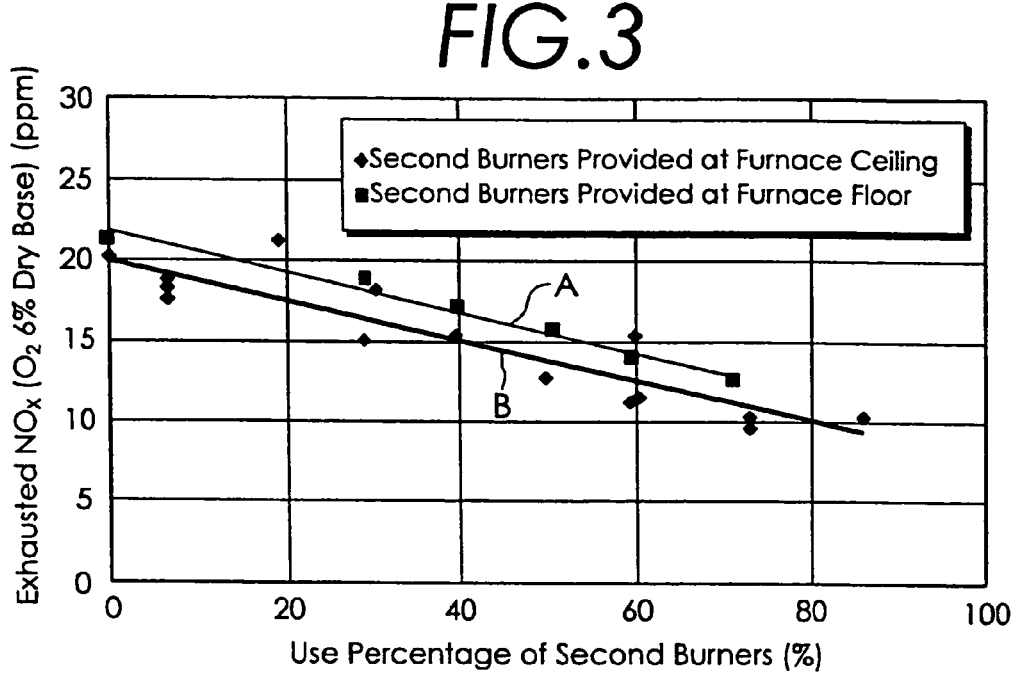
FIG. 3 shows measured relationships of use percentage of the second burners with NOx concentrations in exhaust gas when the second burners are provided at the bottom wall (furnace floor) of the furnace body and when the second burners are provided at the top wall (furnace ceiling) of the furnace body according to another embodiment of the present invention as described later.

FIG. 3 shows measured relationships of use percentage of the second burners with NOx concentrations in exhaust gas in respect of Case (A) as shown in this embodiment where the second burners 8 are provided at the bottom wall (furnace floor) 1a of the furnace body 1 and Case (B) as shown in another embodiment where the second burners are provided at the top wall (furnace ceiling) 1b of the furnace body 1. As indicated by the figure, after the high temperature air combustion state is attained, an amount of NOx can be reduced, irrespective of where the second burners are provided, by reducing the combustion amount of the first burners 3a, 4a, 5a, 6a toward 0% with an increase in combustion of the second burners 8 toward 100%.

Figure 4:
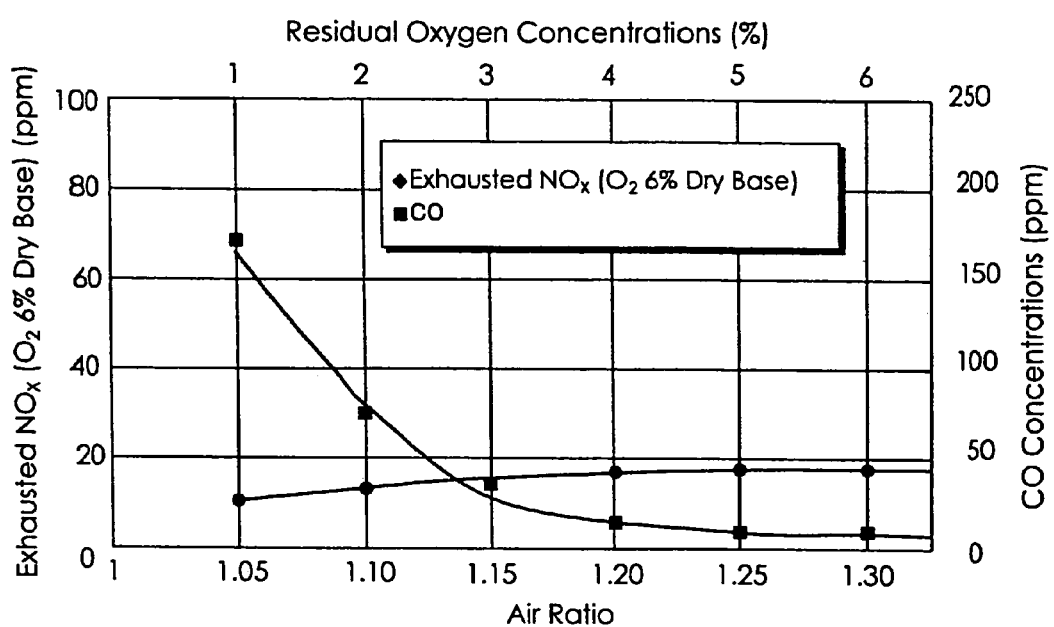
FIG. 4 shows transitions in ppm of NOx and CO in exhaust gas by varying the ratio of air (residual oxygen concentrations) supplied to the combustion chamber when a combustion ratio of the first burners to the second burners is set to 0:100 after the high temperature air combustion state is attained.

Further, FIG. 4 shows transitions in ppm of NOx and CO in exhaust gas by varying the ratio of air (residual oxygen concentrations) supplied to the combustion chamber 2 when a combustion ratio of the first burners 3a, 4a, 5a, 6a to the second burners 8 is set to 0:100 after the high temperature air combustion state is attained. It follows from FIG. 4 that an amount of NOx tends to increase although that of CO gradually decreases by increasing the air ratio (residual oxygen concentrations).

Figure 5:
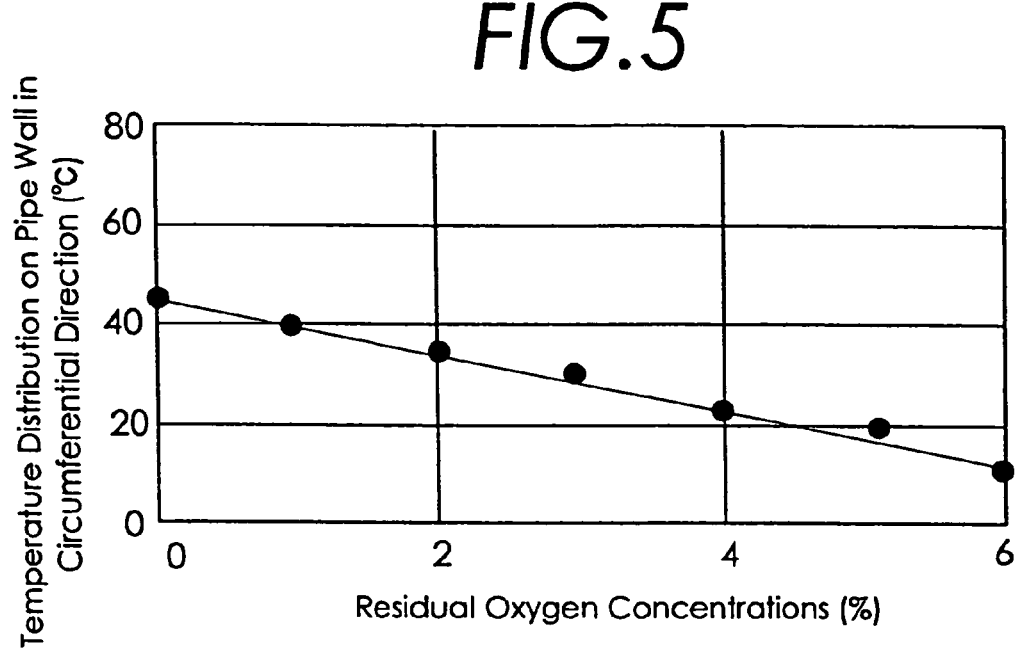
FIG. 5 shows measured averages for the maximum difference in temperature distribution on a pipe wall in a circumferential direction of each reaction pipe by varying the ratio of air (residual oxygen concentrations) supplied to the combustion chamber when a combustion ratio of the first burners to the second burners is set to 40:60 after the high temperature air combustion state is attained.

FIG. 5 shows measured averages for the maximum difference in temperature distribution on a pipe wall in a circumferential direction of each reaction pipe 7 by varying the ratio of air (residual oxygen concentrations) supplied to the combustion chamber 2 when a combustion ratio of the first burners 3a, 4a, 5a, 6a to the second burners 8 is set to 40:60 after the high temperature air combustion state is attained. As known from FIG. 5, once the high temperature air combustion state is attained, a difference in temperature on the pipe walls becomes smaller as oxygen concentrations in the combustion chamber 2 increase. In view of the increasing/decreasing tendency of NOx and that of CO as shown in FIG. 4, preferred residual oxygen concentrations are 3 to 6%. In this embodiment, the best operational mode is such that the combustion ratio is finally set to 0:100 and the oxygen concentrations to 6%.

It has been known that the combustion amount of the first burners 3a, 4a, 5a, 6a is preferably set larger than that of the second burners 8 in order to increase an amount of received heat or efficiency in thermal conduction as much as possible without significantly increasing a difference in temperature among the fields of temperature.

In this embodiment, a positional relationship of the four continuous combustion type regenerative burners (first burners) 3, 4, 5, 6 with the eight second burners 8, 9 and a combustion ratio of the four regenerative burners (first burners) 3, 4, 5, 6 to the eight second burners 8, 9 are defined in a manner that an amount of heat received by the seven reaction pipes 7 becomes more than one, supposing that an amount of heat received by the seven reaction pipes 7 is one when the seven pipes 7 are heated only with the four regenerative burners 3, 4, 5, 6. As described later, in this embodiment, a combustion ratio of the regenerative burners (first burners) 3, 4, 5, 6 to the second burners 8, 9 is set to 80:20.

With the combustion ratio of 80:20, an amount of heat received by each of the reaction pipes can be increased even if an arrangement of the first burners 3a, 4a, 5a, 6a and that of the second burners 8 are varied in possible manners. With the combustion ratios of 80:20 to 50:50, the amount of received heat can also be increased through some difference in amount.

Various arrangements of the first burners and second burners can be considered. As shown in this embodiment, it is preferred that the first burners 3a, 4a, 5a, 6a are fixedly provided at the bottom wall (furnace floor) 1a and the second burners 8 are fixedly provided at the top wall (furnace ceiling) 1b. With this arrangement, the combustion air for the first burners 3a, 4a, 5a, 6a and part of the heat from the first burners 3a, 4a, 5a, 6a approach the vicinity of the second burners 8, thereby helping heat those reaction pipes 7 located in the vicinity of the second burners 8. Therefore, in a case where the second burners 8 are arranged on the same wall portion as the first burners, an amount of heat received by each of the reaction pipes can readily be increased without locally overheating at each of the reaction pipes.

Figure 6:
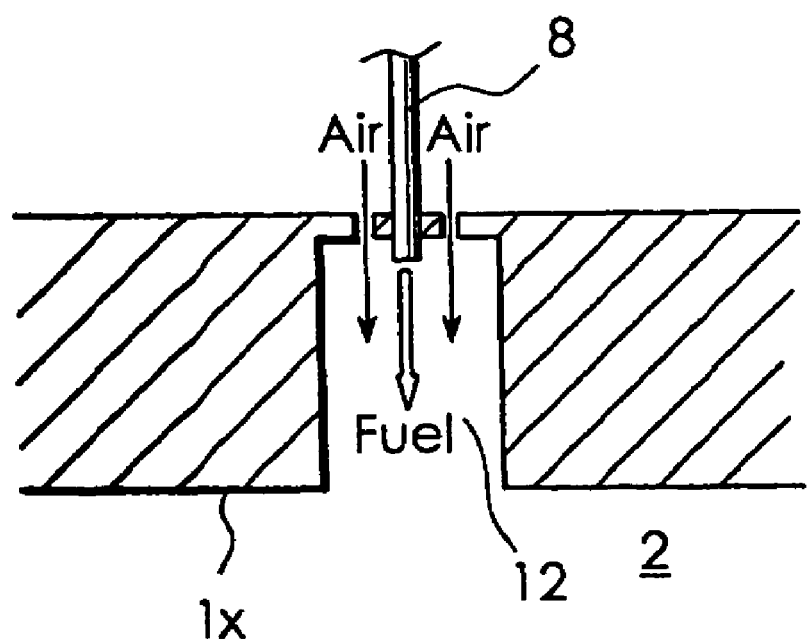
FIG. 6 is a schematic, enlarged, cross-sectional view showing an example of an outlet structure for the second burner.

Preferably, the second burners are so constructed as to form a partial combustion flame of which a maximum gas temperature becomes 500° C. or more. For example, as conceptually shown in FIG. 6, by lowering the second burners 8 by a specified distance below a wall level of the furnace wall 1x and constructing a fuel air mixing chamber 12 in front of the second burners 8, a partial combustion flame can be formed.

Figure 7:
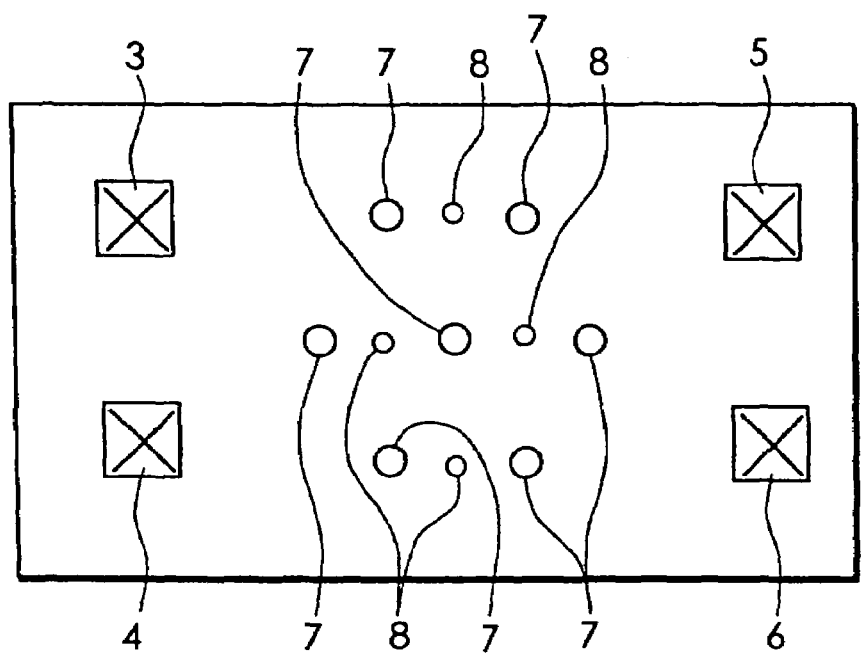
FIG. 7 shows a different arrangement of the second burners.

It is not necessary to arrange the second burners at an equal interval. The second burners can be arranged in such a manner as shown in FIG. 7.

As illustrated in FIGS. 8 to 15, the second burners can differently be arranged. FIGS. 8 to 15 show various arrangements of the first and second burners in different embodiments according to the present invention. In these figures, the same members as those shown in FIG. 1 are designated at the same reference numerals as those used in FIG. 1, and descriptions are omitted thereto.

Figure 8:
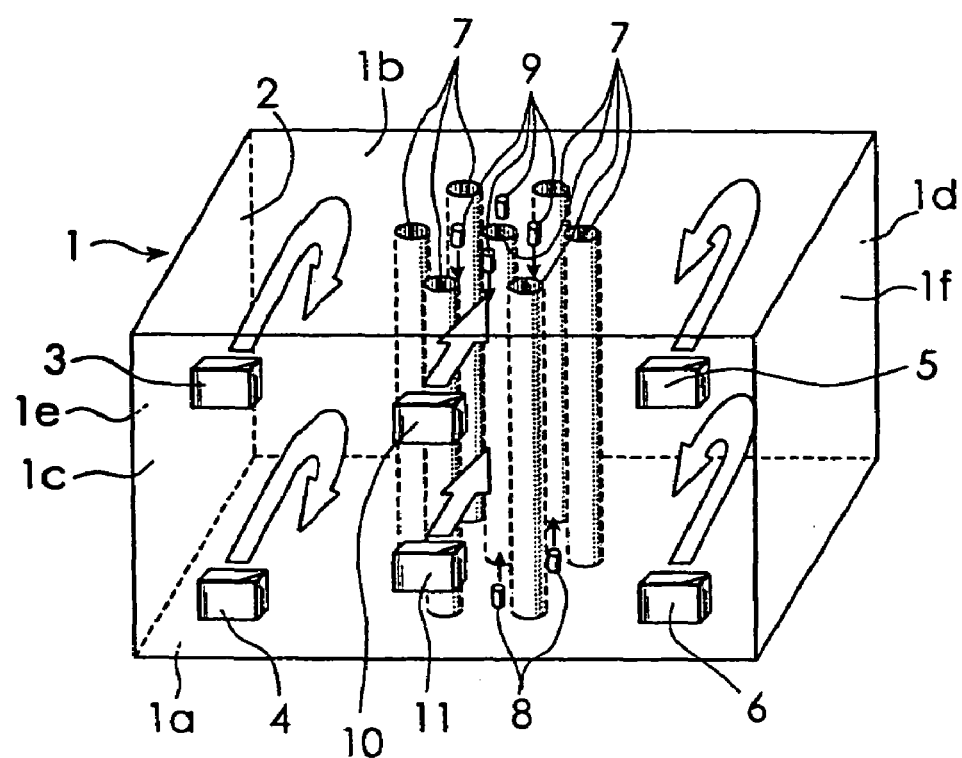
FIG. 8 is a schematic view showing the configuration of a second embodiment of the present invention adapted to a reaction furnace for testing.

FIG. 8 shows another embodiment of a reaction furnace according to the present invention. In this embodiment, four second burners 8 are fixed in a fixing area of the bottom wall 1a and four second burners 9 are fixed in a fixing area of the top wall 1b in a manner that the second burners inject a fuel in an extending direction of seven reaction pipes 7 toward a space defined among tow or more adjacent pipes of the reaction pipes 7. On the side wall 1c of the furnace body 1, two combustion air supply apparatuses 10, 11 for the second burners are arranged at an interval in a longitudinal direction. These two combustion air supply apparatuses 10, 11 for the second burners are constructed in the same manner as the above-mentioned continuous combustion type regenerative burners 3, 4, 5, 6 excluding the burners. Specifically, these two combustion air supply apparatuses 10, 11 for the second burners respectively include a regenerator, a rotating mechanism and air fans. These two combustion air supply apparatuses 10, 11 for the second burners are so constructed to discharge exhaust gas from the combustion chamber 2 to the outside of the furnace through air-permeable regenerators and to supply to the second burners 8, 9 combustion air elevated to a high temperature with sensible heat stored in the regenerators. An amount of the air to be supplied by the two combustion air supply apparatuses 10, 11 for the second burners is preferably set to less than 30% of a theoretical fuel air amount against an amount of the fuel to be supplied by the second burners 8, 9.

Figure 9:
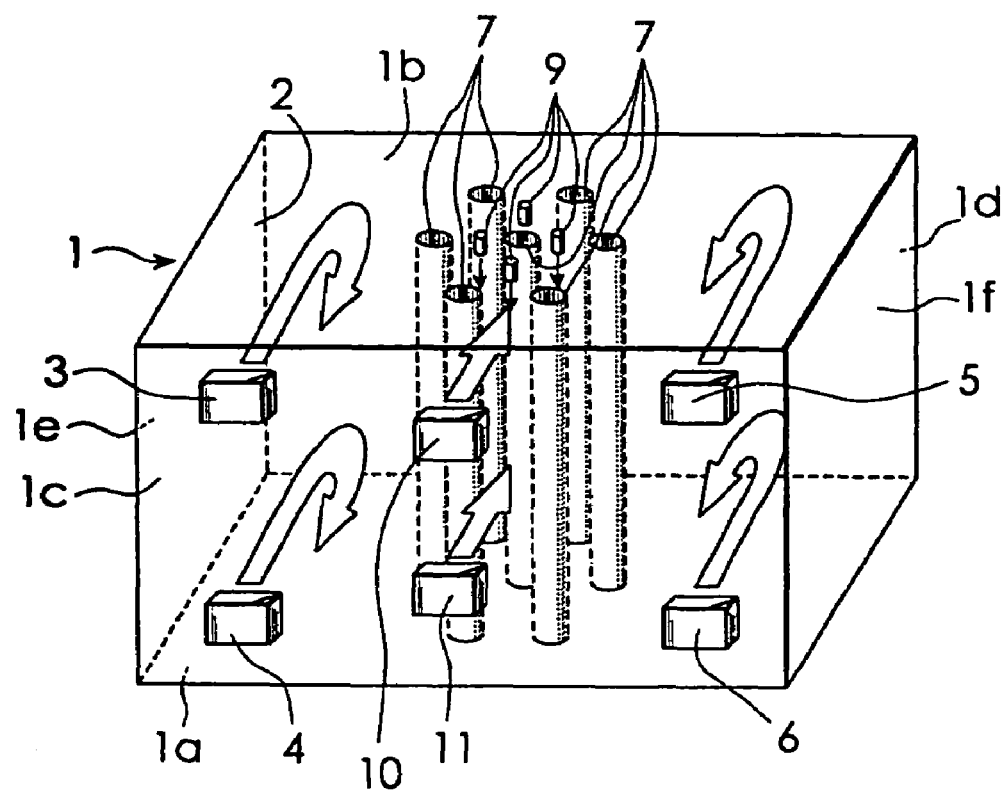
FIG. 9 is a schematic view showing the configuration of a third embodiment of the present invention adapted to a reaction furnace for testing.

FIG. 9 is a schematic view showing the configuration of another embodiment of a reaction furnace according to the present invention. This embodiment differs from the one shown in FIG. 8 in that four second burners 9 are only provided on the top wall 1b.

Figure 10:
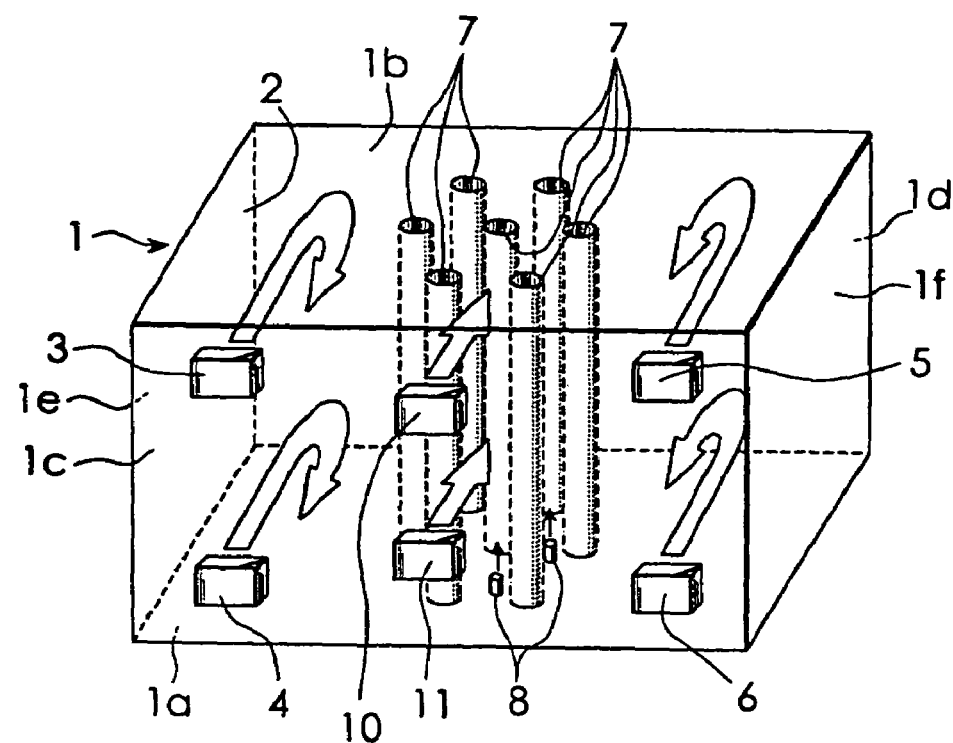
FIG. 10 is a schematic view showing the configuration of a fourth embodiment of the present invention adapted to a reaction furnace for testing.

FIG. 10 is a schematic view showing the configuration of another embodiment of a reaction furnace according to the present invention. This embodiment differs from the one shown in FIG. 8 in that four second burners 8 are only provided on the bottom wall 1a.

Figure 11:
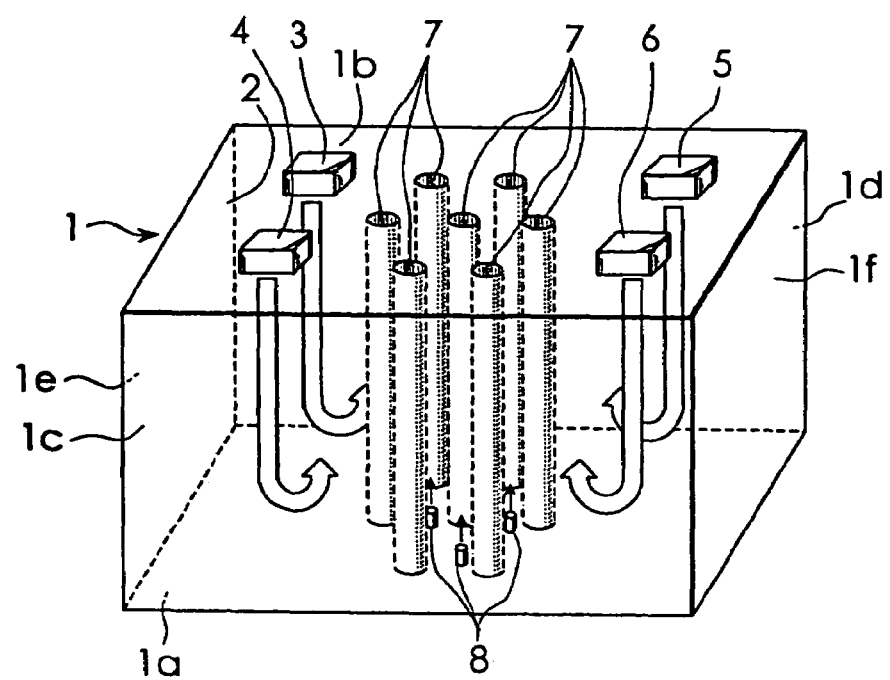
FIG. 11 is a schematic view showing the configuration of a fifth embodiment of the present invention adapted to a reaction furnace for testing.

FIG. 11 is a schematic view showing the configuration of another embodiment of a reaction furnace according to the present invention. This embodiment differs from the one shown in FIG. 8 in that four second burners 8 are only provided on the bottom wall 1a and four continuous combustion type regenerative burners 3, 4, 5, 6 are fixed onto the top wall 1b. Two combustion air supply apparatuses 10, 11 for the second burners (shown in FIG. 8) are omitted from FIG. 11. In this embodiment shown in FIG. 11, two continuous combustion type regenerative burners 3, 4 are arranged on one side of a group of the reaction pipes 7 so as to inject a fuel in an extending direction of the pipes, and two continuous combustion type regenerative burners 5, 6 are arranged on the other side of the group of the reaction pipes 7 so as to inject the fuel in an extending direction of the pipes.

Figure 12:
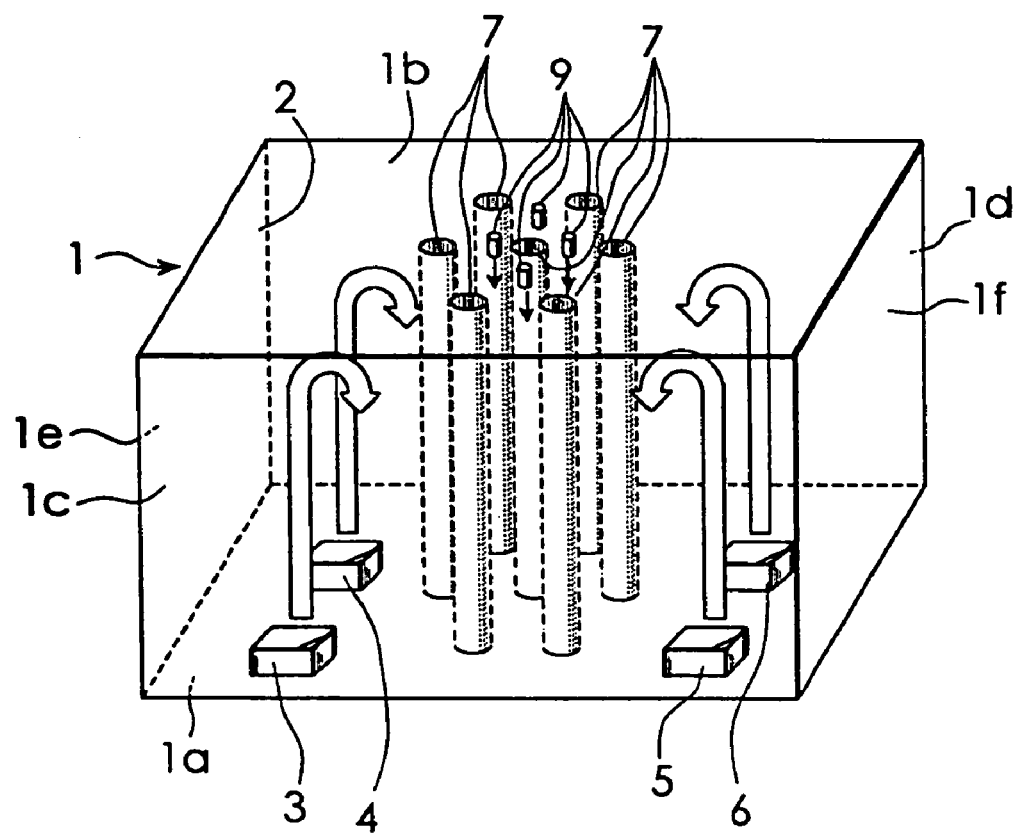
FIG. 12 is a schematic view showing the configuration of a sixth embodiment of the present invention adapted to a reaction furnace for testing.

FIG. 12 is a schematic view showing the configuration of another embodiment of a reaction furnace according to the present invention. This embodiment differs from the one shown in FIG. 8 in that four second burners 9 are only provided on the top wall 1b and four continuous combustion type regenerative burners 3, 4, 5, 6 are fixed onto the bottom wall 1a. Two combustion air supply apparatuses 10, 11 for the second burners (shown in FIG. 8) are omitted from FIG. 12. In this embodiment shown in FIG. 12, two continuous combustion type regenerative burners 3, 4 are arranged on one side of a group of the reaction pipes 7 so as to inject a fuel in an extending direction of the pipes, and two continuous combustion type regenerative burners 5, 6 are arranged on the other side of the group of the reaction pipes 7 so as to inject the fuel in an extending direction of the pipes.

The following table shows transitions in the amount of received heat or efficiency in thermal conduction for each of the reaction pipes 7 when a combustion ratio of the continuous combustion type regenerative burners 3, 4, 5, 6 to the second burners 8 or 9 is varied in respect of the embodiments shown in FIGS. 8 to 12.

TABLE 1

| Combustion Ratio | Embodiments | | | | |
|---|---|---|---|---|---|
| | FIG. 8 | FIG. 9 | FIG. 10 | FIG. 11 | FIG. 12 |
| | Efficiency in Thermal Conduction | | | | |
| 100%:0% | 0.83 | 0.83 | 0.83 | 0.98 | 1.00 |
| 80%:20% | 1.09 | 0.90 | 0.92 | 1.03 | 1.05 |
| 50%:50% | 0.90 | 0.84 | 0.92 | 0.93 | 0.93 |
| 20%:80% | 0.87 | 0.80 | 0.93 | 0.92 | 0.93 |

This table shows the amounts of heat received by the reaction pipes 7 in respect of the embodiments shown in FIGS. 8 to 12 on an assumption that an amount of heat received by the reaction pipes 7 is defined as one when the continuous combustion type regenerative burners 3, 4, 5, 6 are only used for combustion without using the second burners 9 in an embodiment shown in FIG. 12. Therefore, the figures shown in Table 1 denote efficiency in thermal conduction. The combustion ratio column indicates a combustion ratio of "the continuous combustion type regenerative burners 3, 4, 5, 6 (first burners) to the second burners 8, 9". As known from the table, combustion efficiency is more than one when the combustion ratio is set to 80:20 in the embodiments shown in FIGS. 8, 11 and 12. In these embodiments shown in FIGS. 8 to 12, combustion efficiency is maximized to more than one when the combustion ratio is set to 80:20 on an assumption that the amount of heat received for each of the embodiments is defined as one with the combustion ratio of "100%:0%". Therefore, in any of these embodiments, the combustion ratio is preferably set to 80:20.

Figure 13:
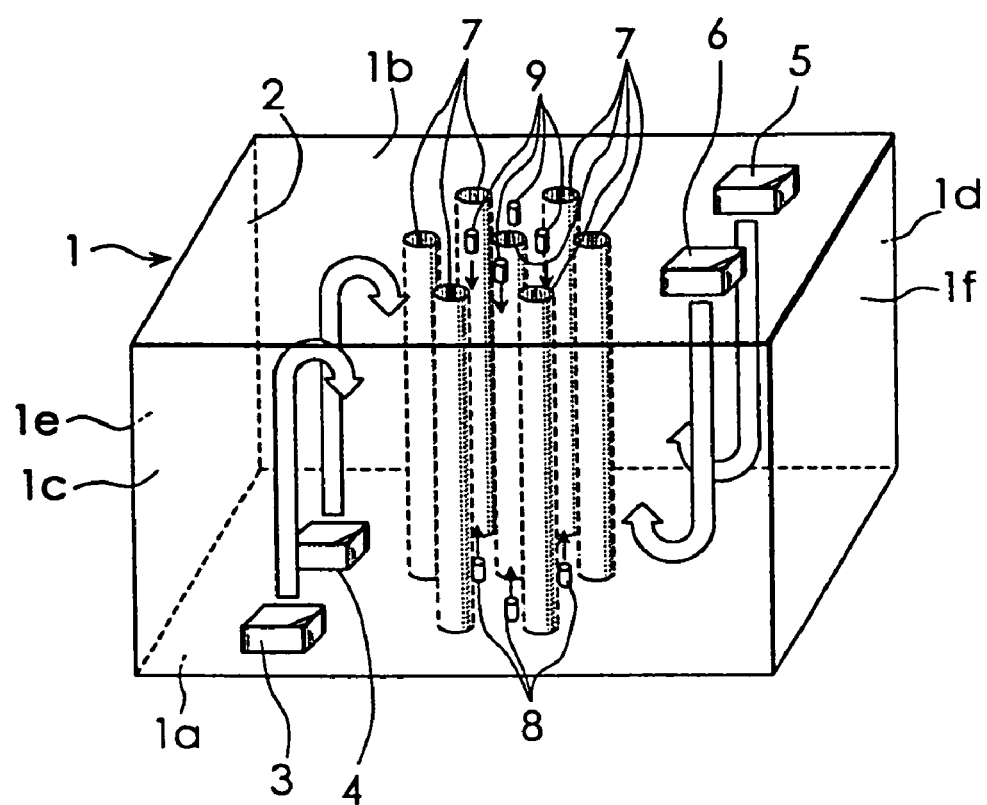
FIG. 13 is a schematic view showing the configuration of a seventh embodiment of the present invention adapted to a reaction furnace for testing.
Figure 14:
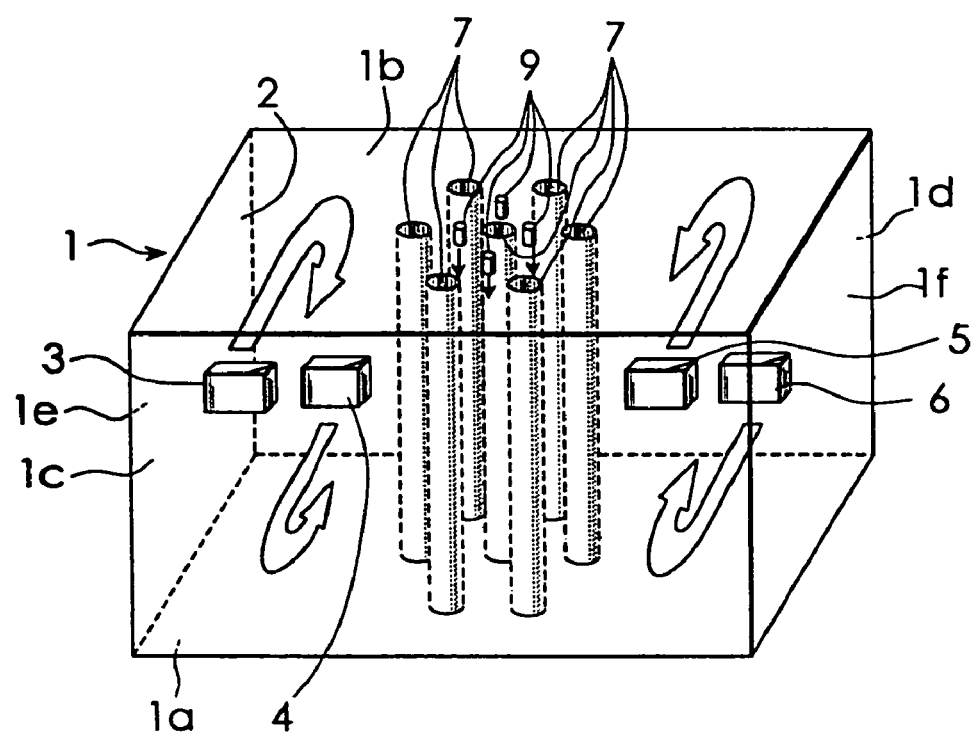
FIG. 14 is a schematic view showing the configuration of an eighth embodiment of the present invention adapted to a reaction furnace for testing.
Figure 15:
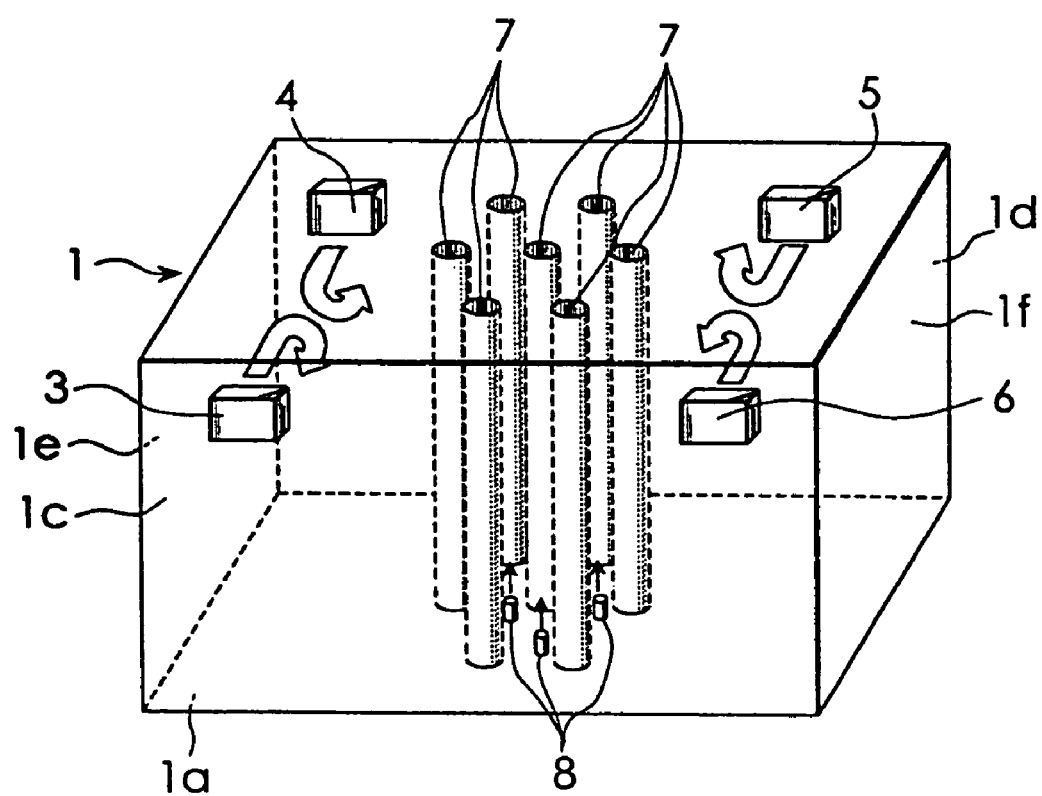
FIG. 15 is a schematic view showing the configuration of a ninth embodiment of the present invention adapted to a reaction furnace for testing.

FIGS. 13 to 15 show other embodiments in which the continuous combustion type regenerative burners 3, 4, 5, 6 and the second burners 8, 9 are differently arranged from one another. In these embodiments, as described above, combustion efficiency can be maximized by setting the combustion ratio to 80:20.

In each of the above-mentioned embodiments, the second burners and partial combustion air supply apparatuses for the second burners are separately provided. However, the second burners and combustion air supply apparatuses for the second burners may collectively be arranged to constitute a one-burner system, namely continuous combustion type regenerative burners.

In these embodiments, continuous combustion type regenerative burners of a high temperature air combustion type are used. Certainly, regenerative burners of other types such as rotary and alternate regenerative burners may also be used.

INDUSTRIAL APPLICABILITY

According to the present invention, it is possible to prevent a difference in temperature among the fields of temperature inside the reaction furnace from becoming so large as to cause cracks of the reaction pipes or coking at the start of combustion. It is also possible to prevent a difference in temperature among the fields of temperature in the combustion chamber from becoming so large as to cause cracks of the reaction pipes or coking by reducing the combustion amount of the first burners with an increase in combustion of the one or more second burners after a high temperature air combustion state is attained in the combustion chamber of the reaction furnace.

What is claimed is:

1. A method for controlling combustion of a reaction furnace comprising:
    a furnace body having a furnace wall which surrounds a combustion chamber therein,
    a plurality of reaction pipes provided between a pair of opposing wall portions of said furnace wall of said furnace body and juxtaposedly arranged therebetween so as to extend in the same direction,
    a plurality of first burners arranged outside said reaction pipes and provided at said furnace wall of said furnace body for burning a fuel in said combustion chamber,
    one or more second burners fixedly provided in at least one of paired fixing areas of said paired wall portions in which said reaction pipes are provided, so as to inject the fuel in an axial direction of said reaction pipes toward a space defined among two or more adjacent pipes of said reaction pipes, and
    a heat exchange type combustion air supply apparatus for discharging exhaust gas from said combustion chamber to the outside of said reaction furnace through an air-permeable regenerating means and supplying to said combustion chamber combustion air elevated to a high temperature with sensible heat stored in said regenerating means;
    wherein the method comprises steps of:
    operating only said first burners to burn the fuel to elevate a temperature in said combustion chamber until the inside of said combustion chamber gets into a high temperature air combustion state,
    operating said one or more second burners to burn the fuel after the high temperature air combustion state is attained in said combustion chamber, and
    reducing a combustion amount of said first burners with an increase in combustion of said one or more second burners to thereby attain a necessary combustion state.

2. The method for controlling combustion of a reaction furnace as defined in claim 1, wherein a ratio of the combustion amount of said first burners to the combustion amount of said one or more second burners is maintained at a level for said necessary combustion state after said necessary combustion state is attained.

3. The method for controlling combustion of a reaction furnace as defined in claim 2, wherein the ratio of the combustion amount of said first burners to the combustion amount of said one or more second burners falls within a range of 80:20 to 0:100.

4. The method for controlling combustion of a reaction furnace as defined in claim 1, wherein said necessary combustion state is attained in a manner that temperature distribution on a pipe wall in a circumferential direction of said reaction pipe does not become extremely ununiform in respect of each of said reaction pipes.

5. The method for controlling combustion of a reaction furnace as defined in claim 4, wherein the ratio of the combustion amount of said first burners to the combustion amount of said one or more second burners falls within a range of 50:50 to 0:100.

6. The method for controlling combustion of a reaction furnace as defined in claim 5, wherein an amount of air to be supplied to said combustion chamber by said heat exchange type combustion air supply apparatus is so defined that an average of oxygen concentrations in said exhaust gas falls within a range of 3.5 to 6%.

7. A method for controlling combustion of a reaction furnace comprising:
    a furnace body having a furnace wall which surrounds a combustion chamber therein,
    a plurality of reaction pipes provided between a pair of opposing wall portions of said furnace wall of said furnace body and juxtaposedly arranged therebetween so as to extend in the same direction,
    a plurality of first burners arranged outside said reaction pipes and provided at said furnace wall of said furnace body for burning a fuel in said combustion chamber,
    one or more second burners fixedly provided in at least one of paired fixing areas of said paired wall portions in which said reaction pipes are provided, so as to inject the fuel in an axial direction of said reaction pipes toward a space defined among two or more adjacent pipes of said reaction pipes, and
    a heat exchange type combustion air supply apparatus for discharging exhaust gas from said combustion chamber to the outside of said reaction furnace through an air-permeable regenerating means and supplying to said combustion chamber combustion air elevated to a high temperature with sensible heat stored in said regenerating means;
    wherein the method comprises steps of:
    primarily operating said first burners to burn the fuel to elevate a temperature in said combustion chamber until the inside of said combustion chamber gets into a high temperature air combustion state,
    increasing a combustion amount of said one or more second burners after the high temperature air combustion state is attained in said combustion chamber, and
    reducing a combustion amount of said first burners with an increase in combustion of said one or more second burners to thereby attain a necessary combustion state.

8. The method for controlling combustion of a reaction furnace as defined in claim 7, wherein a ratio of the combustion amount of said first burners to the combustion amount of said one or more second burners is maintained at a level for said necessary combustion state after said necessary combustion state is attained.

9. The method for controlling combustion of a reaction furnace as defined in claim 8, wherein the ratio of the combustion amount of said first burners to the combustion amount of said one or more second burners falls within a range of 80:20 to 0:100.

10. The method for controlling combustion of a reaction furnace as defined in claim 7, wherein said necessary combustion state is attained in a manner that temperature distribution on a pipe wall in a circumferential direction of said reaction pipe does not become extremely ununiform in respect of each of said reaction pipes.

11. The method for controlling combustion of a reaction furnace as defined in claim 10, wherein the ratio of the combustion amount of said first burners to the combustion amount of said one or more second burners falls within a range of 50:50 to 0:100.

12. The method for controlling combustion of a reaction furnace as defined in claim 11, wherein an amount of air to be supplied to said combustion chamber by said heat exchange type combustion air supply apparatus is so defined that an average of oxygen concentrations in said exhaust gas falls within a range of 3.5 to 6%.

13. A reaction furnace comprising:
    a furnace body having a furnace wall which surrounds a combustion chamber therein,
    a plurality of reaction pipes provided between a pair of opposing wall portions of said furnace wall of said furnace body and juxtaposedly arranged therebetween so as to extend in the same direction, a plurality of first burners arranged outside said reaction pipes and provided at said furnace wall of said furnace body for burning a fuel in said combustion chamber, a plurality of partial combustion air supply apparatuses for said first burners arranged outside said reaction pipes and so constructed as to discharge exhaust gas from said combustion chamber to the outside of said reaction furnace through one or more air-permeable regenerators and to supply to said first burners combustion air elevated to a high temperature with sensible heat stored in said one or more regenerators, one or more second burners fixedly provided in at least one of paired fixing areas of said paired wall portions in which said reaction pipes are provided, so as to inject the fuel in an axial direction of said reaction pipes toward a space defined among two or more adjacent pipes of said reaction pipes, and one or more partial combustion air supply apparatuses for said one or more second burners so constructed as to discharge exhaust gas from said combustion chamber to the outside of said reaction furnace through one or more air-permeable regenerators and to supply to said one or more second burners combustion air elevated to a high temperature with sensible heat stored in said one or more regenerators;

wherein a ratio of the combustion amount of said first burners to the combustion amount of said one or more second burners falls within a range of 50:50 to 0:100 when the inside of said combustion chamber is in a high temperature air combustion state.

14. The reaction furnace as defined in claim 13, wherein an amount of air to be supplied to said combustion chamber by said partial combustion air supply apparatus for said first burner and/or that of air to be supplied to said combustion chamber by said partial combustion air supply apparatus for said second burner is so defined that an average of oxygen concentrations in said exhaust gas falls within a range of 3.5 to 6%.

15. The reaction furnace as defined in claim 13, wherein said first burners are fixedly provided at one of said paired wall portions and said second burners are fixedly provided on the other wall portion.

16. The reaction furnace as defined in claim 15, wherein said second burner is so constructed as to form a partial combustion flame of which a maximum gas temperature becomes 500° C. or more.

17. The reaction furnace as defined in claim 13, wherein said first burner and said partial combustion air supply apparatus for said first burner are combined to constitute one regenerative burner of a high temperature air combustion type, and said second burner and said partial combustion air supply apparatus for said second burner are combined to constitute one regenerative burner of a high temperature air combustion type.

18. A reaction furnace comprising:

a furnace body having a furnace wall which surrounds a combustion chamber therein, a plurality of first burners provided at said furnace wall of said furnace body for burning a fuel in said combustion chamber, a plurality of partial combustion air supply apparatuses for said first burners so constructed as to discharge exhaust gas from said combustion chamber to the outside of said reaction furnace through one or more air-permeable regenerators and to supply to said first burners combustion air elevated to a high temperature with sensible heat stored in said one or more regenerators, a plurality of reaction pipes fixedly provided between a pair of opposing wall portions of said furnace wall so as to extend in the same direction, one or more second burners fixedly provided in at least one of paired fixing areas of said paired wall portions onto which said reaction pipes are fixed, so as to inject the fuel in said extending direction of said reaction pipes toward a space defined among two or more adjacent pipes of said reaction pipes, and one or more partial combustion air supply apparatuses for said one or more second burners for discharging exhaust gas from said combustion chamber to the outside of said reaction furnace through one or more air-permeable regenerators and supplying to said one or more second burners combustion air elevated to a high temperature with sensible heat stored in said regenerators;

wherein the plurality of said first burners are arranged outside said reaction pipes and fixedly provided at said furnace wall so as to inject the fuel in an extending direction of said reaction pipes or a direction crossing said extending direction of said reaction pipes; and wherein a positional relationship of said first burners with said one or more second burners and a combustion ratio of said first burners to said one or more second burners are defined in a manner that efficiency in thermal conduction of said reaction pipes becomes more than one, supposing that an amount of heat received by said reaction pipes is one when said reaction pipes are heated only with said first burners.

19. The reaction furnace as defined in claim 18, wherein said first burners are fixedly provided at one of said paired wall portions and said one or more second burners are fixedly provided at the other wall portion, and said first burners are dispersedly arranged so that said reaction pipes exist therebetween.

20. The reaction furnace as defined in claim 18, wherein said one or more second burners are fixed onto either of said paired wall portions, and said first burners are dispersedly arranged at a pair of opposing wall portions other than said paired wall portions so that said reaction pipes exist therebetween.

21. The reaction furnace as defined in claim 18, wherein a combustion ratio of said first burners to said one or more second burners is 80:20.

22. The reaction furnace as defined in claim 18, wherein said one or more partial combustion air supply apparatuses for said one or more second burner are so arranged as to supply said combustion air to said one or more second burners from the outside of said reaction pipes, and an amount of the air to be supplied by said partial combustion air supply apparatus for said second burner is less than 30% of a theoretical fuel air amount against an amount of the fuel to be supplied by said second burner.

23. The reaction furnace as defined in claim 22, wherein said reaction pipes are so arranged that a distance between any two adjacent pipes of said reaction pipes is equal, and said second burners are so arranged that a distance between any adjacent second burner and reaction pipe is equal.

24. The reaction furnace as defined in claim 18, wherein said first burner and said partial combustion air supply apparatus for said first burner are combined to constitute one regenerative burner of a high temperature air combustion type, and said second burner and said partial combustion air supply apparatus for said second burner are combined to constitute one regenerative burner of a high temperature air combustion type.

* * * * *